United States Patent
Kikuchi et al.

(10) Patent No.: US 7,295,543 B2
(45) Date of Patent: Nov. 13, 2007

(54) NETWORK INTERCONNECTION APPARATUS, NETWORK INTERCONNECTION METHOD, NAME RESOLUTION APPARATUS AND COMPUTER PROGRAM

(75) Inventors: Hidenori Kikuchi, Tokyo (JP); Hideyuki Asai, Tokyo (JP)

(73) Assignee: Sony Corporation, Tokyo (JP)

( * ) Notice: Subject to any disclaimer, the term of this patent is extended or adjusted under 35 U.S.C. 154(b) by 540 days.

(21) Appl. No.: 10/900,876

(22) Filed: Jul. 27, 2004

(65) Prior Publication Data
US 2005/0058143 A1    Mar. 17, 2005

(30) Foreign Application Priority Data
Jul. 28, 2003    (JP)    ............. 2003-280782

(51) Int. Cl.
H04Q 7/24    (2006.01)
(52) U.S. Cl. .............. 370/338; 370/352; 370/469; 455/419; 455/420; 709/227; 725/119
(58) Field of Classification Search ........... 370/338, 370/352, 469; 455/419, 420; 709/227; 725/119
See application file for complete search history.

(56) References Cited

U.S. PATENT DOCUMENTS

| | | | |
|---|---|---|---|
| 5,802,305 A | | 9/1998 | McKaughan et al. |
| 6,785,279 B1 * | | 8/2004 | Crooks ................ 370/392 |
| 6,816,890 B2 * | | 11/2004 | Noda et al. ............ 709/213 |
| 6,859,452 B1 * | | 2/2005 | Crooks ................ 370/355 |
| 6,880,089 B1 * | | 4/2005 | Bommareddy et al. ...... 726/11 |
| 6,981,047 B2 * | | 12/2005 | Hanson et al. ........... 709/227 |
| 7,127,496 B2 * | | 10/2006 | Isozu et al. ............ 709/217 |
| 7,136,645 B2 * | | 11/2006 | Hanson et al. .......... 455/435.1 |
| 7,200,651 B1 * | | 4/2007 | Niemi ................. 709/223 |
| 2003/0002496 A1 | | 1/2003 | Beier |
| 2003/0106067 A1 * | | 6/2003 | Hoskins et al. .......... 725/119 |
| 2003/0126610 A1 * | | 7/2003 | Ando ................. 725/91 |
| 2003/0135411 A1 | | 7/2003 | Ushiki et al. |

(Continued)

FOREIGN PATENT DOCUMENTS

EP    1 017 208    7/2000

(Continued)

OTHER PUBLICATIONS

Yap Ken: "Wake On LAN proxy (readme, wold.c, wolc.pl, wolc.py, sample.dat from wolp-0.5.tar.gz; index of /wolp)" ?, Apr. 13, 2003, XP002364611.

(Continued)

Primary Examiner—Danh Le
(74) Attorney, Agent, or Firm—Frommer Lawrence & Haug LLP; William S. Frommer; Thomas F. Presson

(57) ABSTRACT

A power source of a LAN terminal at a home such as home server is turned on from the outside the home via the Internet. A home gateway apparatus receives such a start request by proxy and transmits a start instruction packet to corresponding equipment on the home LAN. Although there is a case where the protocols of an external network and the home LAN are different from each other, the home gateway apparatus performs a protocol conversion process for assimilating discrepancy between the protocols. Moreover, on the home LAN, the start instruction packet to the corresponding equipment maybe be issued by utilizing a magic packet technique.

23 Claims, 9 Drawing Sheets

U.S. PATENT DOCUMENTS

2004/0008652 A1* 1/2004 Tanzella et al. ............ 370/338

FOREIGN PATENT DOCUMENTS

| JP | 7 321940 | 12/1995 |
| JP | 2003 101564 | 4/2003 |

OTHER PUBLICATIONS

Stuart Cheshire Apple Computer et al: "Multicast DNS; draft-cheshire-dnsext-multicastdns-03.txt;" IETF Standard-Working-Draft, Internet Engineering Task Force, IETF, CH, No. 3, Jan. 29, 2003, XP015011701 ISSN: 0000-0004 Chapter 16: "Multicast DNS and Power Management" *p. 31 -p. 32*.

Pab-Lung Tsai et a l: "A remote control scheme for ubiquitos personal computing" Networking, Sensing and Control, 2004 IEEE International Conference on Taipei, Taiwan Mar. 21-23, 2004, Piscataway, NJ, USA,IEEE, vol. 2, Mar. 21, 2004, pp. 1020-1025, XP010705524 ISBN: 0-7803-8193-9.

"Magic Packet Technology" White Paper AMD, Nov. 30, 1995, pp. 1-5, XP002235866 *p. 4*.

Patent Abstracts of Japan, vol. 2003, No. 02, Feb. 5, 2003 & JP 2002 305531 A (Ko Shiyougan), Oct. 18, 2002.

Patent Abstracts of Japan, vol. 2000, No. 07, Sep. 29, 2000 & JP 2000 101589 A (Nippon Telegr & Teleph Corp &It;NTT>), Apr. 7, 2000.

Patent Abstracts of Japan, vol. 2000, No. 07, Sep. 29, 2000 & JP 2000 112851 A (Nippon Telegr & Teleph Corp &It;NTT>), Apr. 21, 2000.

Patent Abstracts of Japan, vol. 2003, No. 05, May 12, 2003 & JP 2003 008602 A (Hitachi Cable Ltd), Jan. 10, 2003.

Patent Abstracts of Japan, vol. 2000, No. 15, Apr. 6, 2001 & JP 2000 341325 A (Matsushita Electric Works Ltd), Dec. 8, 2000.

* cited by examiner

FIG.12

| | | |
|---|---|---|
| NICKNAME | | |
| TERMINAL REGISTRATION | MANUAL REGISTRATION | |
| | SELECT FROM LIST | COMPUTER NAME: MAC ADDRESS ▼ |

TOOL BAR OF WEB BROWSER

ADDRESS

Video-server:ac-12-de-34-fg-56
computer123:hi-jk-90-67-yt-87

START TEST

※MAC ADDRESS IS NOT ACTUALLY EXISTING ONE

NETWORK INTERCONNECTION APPARATUS, NETWORK INTERCONNECTION METHOD, NAME RESOLUTION APPARATUS AND COMPUTER PROGRAM

CROSS REFERENCE TO RELATED APPLICATION

The present document is based on Japanese Priority Document JP2003-280782, filed in the Japanese Patent Office on Jul. 28, 2003, the entire contents of which being incorporated herein by reference.

BACKGROUND OF THE INVENTION

1. Field of the Invention

The present invention relates to a network interconnection apparatus, a network interconnection method, a name resolution apparatus and a computer program, which are for interconnecting different systems or networks. More particularly, the present invention relates to a network interconnection apparatus, a network interconnection method, a name resolution apparatus and a computer program, which are for interconnecting an external public wide area network such as a WAN or the Internet with a home private network such as a local area network (LAN).

More specifically, the present invention relates to a network interconnection apparatus, a network interconnection method, a name resolution apparatus and a computer program, which are for accessing a LAN terminal on a home private network from an external network such as the Internet. More particularly, the present invention relates to a network interconnection apparatus, a network interconnection method, a name resolution apparatus and a computer program, which are for performing a start request to a LAN terminal on a home private network from an external network such as the Internet.

2. Description of Related Art

Along with the recent popularization of the Internet, various digital contents of the network including computer files and other shave been vigorously distributed. Moreover, the development of broadband communication networks (such as an x digital subscriber line (x-DSL)), a cable television (CATV) and a wireless network is remarkable. Also in Japan, the Internet by means of broadband communication lines has been rapidly popularized to such a degree that the number of the users of the Internet using rapid broadband lines such as Asymmetric Digital Subscriber Line (ADSL) and a fiber to the home (FTTH) exceeds ten million. Under such a background, a mechanism for enabling the transmission of the distribution of rich contents such as music data, image data, digital data of electronic publications, and moving images without causing stress to a user.

Moreover, techniques of a computer and a network have deeply infiltrated into general homes recently. Home information apparatus such as a personal computer and a personal digital assistant (PDA), and various intelligent home appliances such as a television receiver and video reproducing apparatus are interconnected with each other through a home LAN. Moreover, such a home LAN is interconnected with an external wide area network such as the Internet through a router in many cases. Then, the contents duly obtained from a server on the Internet are stored in a server on the home LAN (hereinafter referred to as a "home server"), and after that the contents are distributed to the other terminals (clients) in the home through the home LAN.

The popularization of broadband networks and home LAN makes it possible to access a home personal computer or a home server from outside or a place where a user has gone, to enjoy a TV program which the user has recorded, music, a private photograph and a moving image, or to control home equipment. This is because a user can refer and operate them without feeling any stress by virtue of high speed and wide band broadband lines when the user accesses his or her home from the outside the home through the Internet. Moreover, a high speed wide band access environment called as a public wireless LAN service, which is an Internet connection environment on the outside the home, has been spread, and it is expected that server apparatuses and its services for enabling freely accessing from the outside the home to the inside the home will be popularized in the future.

However, when a person accesses and controls a home server apparatus from the outside a home, it is necessary that power sources of the home server apparatus and the other terminals connected to the home LAN are always in the on states. Unlike operations of a server for business, if the power source of the server will be constantly on state for a personal use it can be said that it is a problem from the view of the cost of electricity expenses and environments.

Techniques for remotely starting a power source of a LAN terminal were proposed in the past. However, many of them were for the use of enterprises, and the use in homes was out of sight.

For example, an inter-LAN connection apparatus for making it easy to configure a LAN by remotely controlling power sources of terminals has been proposed (see, for example, Patent Document 1). In this case, a terminal transmits a power start request to an inter-LAN connection apparatus on the other terminal side through another inter-LAN connection apparatus and a wide area network. Then, the inter-LAN connection apparatus, which has received the power start request, instructs the terminal, which is the destination of the request, the starting of the power source through a cable for operation control. According to such a procedure, the power source of a terminal in a LAN can be turned on through a wide area network.

However, in this case, it is necessary to connect the cables for operation control between the inter-LAN connection apparatus and the LAN terminals. When a LAN is configured, Ethernet (registered trademark) LAN cables is generally used, however,when dedicated cables are used for the control of the power sources, personal computers or the like as the LAN terminals should be dealt with like hardware.

Moreover, in this case, for starting a LAN terminal, firstly a LAN connection apparatus connected to a certain LAN terminal which a user wish to start with a cable for operation control is remotely logged, and then a start instruction is executed in accordance with a command. The protocol at this time is supposed to be Telnet, but it is difficult for a general consumer to perform the procedure in accordance with the Telnet protocol.

Moreover, there is known a technique called as "Magic Packet (trademark)" available from AMD Corp. in US (see, for example, Patent Document 2). The technique has a mechanism of transmitting a magic packet from a remote LAN terminal to a certain LAN terminal which a user wish to starton a LAN configured in accordance with Ethernet (registered trademark) in conformity with Institute of Electrical and Electronics Engineers (IEEE) in order to start the power source of the received LAN terminal. By means of the magic packet, there is no need of any specified cables for remotely starting a terminal.

However, the magic packet technique operates on a layer 2 network. Consequently, the magic packet cannot be transmitted via a router, and it is necessary that a LAN terminal transmitting a start instruction (a transmission source of the magic packet) and a LAN terminal receiving the start instruction (a destination of the magic packet) are on the same LAN segment. In other words, the magic packet technique does not expect a case of starting a power source from a remote terminal via a WAN of a layer 3 network over a LAN segment as the above-mentioned case of accessing a terminal in a home from the outside a home. For example, in case of via the public Internet, if a magic packet is transmitted from a remote terminal, the packet is abandoned because there is no routing information.

Moreover, when a magic packet is transmitted, some software for transmitting the magic packet is necessary to be installed in a terminal (such as a personal computer) giving a command. It is necessary to register a machine access control (MAC) address unique to the terminal to be intended to be started, the a user is obliged to perform a troublesome operation to register a MAC address composed of an alphabetic character of 12 digits manually.

Moreover, the magic packet technology does not regulate a method or a procedure for confirming whether the intended terminal to be wished to be started has really started its power source or not after the transmission of the magic packet.

[Patent Document 1] Japanese Patent Application Publication No. Hei 7-327044

[Patent Document 2] Japanese Patent Application Publication No. Hei 10-175201

SUMMARY OF THE INVENTION

The present invention has been made under the above described circumstances and provides a network interconnection apparatus, a network interconnection method, a name resolution apparatus and a computer program, which are preferably interconnecting an external public WAN network, such as the Internet, with a home private network, such as a LAN.

Further, the present invention provides a network interconnection apparatus, a network interconnection method, a name resolution apparatus and a computer program, which are enabling a suitable access from an external network such as the Internet to a LAN terminal on a home private network.

Further, the present invention provides a network interconnection apparatus, a network interconnection method, a name resolution apparatus and a computer program, which are capable of performing a suitable start process of a LAN terminal on a home private network in response to a start request from an external network such as the Internet.

Still further, in this broadband age as a background, the present invention provides a network interconnection apparatus, a network interconnection method, a name resolution apparatus and a computer program, which are capable of turning on power sources of a home server and LAN terminals placed in a home from the outside the house via the Internet freely and in a simple manner.

The present invention was made in view of the above circumstances. A first aspect of the invention is a network interconnection apparatus for interconnecting an external network with internal network, the apparatus including: first communication means for communicating on the external network; second communication means for communicating on the internal network;internal network management means for obtaining a configuration in the internal network and managing correspondence relations among a unique address of each terminal (e.g. a MAC address) on the internal network, terminal names to be easily identifiable by a user, and private network addresses assigned in the internal network;start request reception means for receiving by proxy start requests to terminals on the internal network via the external network; and start request transfer means for identifying the terminals of requested destinations of the start requests received by the start request reception means on a basis of the correspondence relations to transfer the start requests to the terminals of the requested destinations via the internal network.

According to the network interconnection apparatus of the present invention, a start process of terminals can be suitably performed to the start requests from the external network to the LAN terminals on the home private network. At this time, a remote user can transmit the start requests to the terminals on the internal network with a domain name of the network interconnection apparatus and a terminal name (e.g. computer names supplied by an operating system such as Windows (registered trademark)) of the start request destination terminals being designated.

While a host apparatus such as a Web server has a fixed network address (IP address), the global network address on the external network of the network interconnection apparatus is dynamically assigned. Accordingly, name resolution means for managing a correspondence relation between the domain name and the global network address of the network interconnection apparatus may be disposed on the external network. When a start request is transmitted from the remote user, it is possible to send the start request to the network interconnection apparatus by means of the name resolution means.

Moreover, the start request transfer means may perform a protocol conversion in order to assimilate discrepancy of the protocols between the external network and the internal network.

Moreover, the start request transfer means may transfer the start requests to the start request destination terminals via the internal network by means of the magic packet.

Moreover, the network interconnection apparatus of the present invention may further include authentication processing means for performing a predetermined authentication procedure to an access requesting source via the external network. In such a case, in response to a success of the authentication procedure, the start request reception means can receive the start requests by proxy and/or the start request transfer means can transfer the start requests to the requested destination terminals.

Moreover, the network interconnection apparatus of the present invention may further include start state confirmation means for confirming the start state of each terminal on the internal network. The network interconnection apparatus can confirm the start states on the internal network by means of, for example, a ping program for issuing an IP packet to the LAN terminals by means of an Internet control message protocol (ICMP) to confirm an answer.

It is required for a user to register in advance at home the LAN terminals which the user wishes to start at home. Accordingly, the network interconnection apparatus of the present invention may further include pre-processing means for performing previous registration procedures on the internal network with respect to the terminals to be started in response to the start requests from the external network among the terminals managed by the internal network management means.

In such a case, in the network interconnection apparatus, only the case where the start request destination terminals are previously registered to the start requests from the external network, the start request reception means receives the start requests by proxy, and/or the start request transfer means transfers the start requests to the requested destination terminal.

Moreover, the network interconnection apparatus of the present invention may further include internal network information providing means for providing start state presenting means of for presenting the start state of each terminal on the internal network, start execution instruction means for instructing the execution of the start of each terminal, and start confirmation means for confirming of the start of each terminal, to a start requesting source via the external network.

The internal network information providing means provides the start state presenting means, the start execution instruction means, and the start confirmation means in, for example, the format of Hyper Text Markup Language (HTML). In such a case, on the remote terminal side, an operation screen for the performance of the presentation of the start states of the LAN terminals, the instruction of the execution of the starts, and the confirmation of the starts is provided in the form of a Web page. Consequently, a terminal to access the network interconnection apparatus via the external network can use a network interconnection service of the present invention only by being provided with a standard Web browser.

Moreover, on the operation screen having the format of the Web page, the internal network information providing means provides an operational environment enabling the operations of the presentation of the start states of the terminals, the instruction of the execution of the starts, and the presentation of the confirmation of the starts, all utilizing terminal names which the user can easily identify. In such a case, the names of the LAN terminals of which the power sources can be started from the outside among the LAN terminals connected in a home are displayed by their nicknames such as computer names.

Moreover, a second aspect of the present invention is a computer program described in a computer readable format in order to execute a process for interconnecting an external network and an internal network to each other on a computer system, the program including: an internal network management step of obtaining a configuration in the internal network and managing correspondence relations among a unique address of each terminal on the internal network, terminal names to be easily identifiable by a user, and private network addresses assigned in the internal network; a start request reception step of receiving by proxy start requests to terminals on the internal network via the external network; and a start request transfer step of identifying the terminals of requested destinations of the start requests received at the start request reception step on a basis of the correspondence relations to transfer the start requests to the terminals of the requested destinations via the internal network.

The computer program according to the second aspect of the present invention defines a computer program described in the computer readable format in order to implement a predetermined process on a computer system. In other words, by the installation of the computer program according to the second aspect of the present invention on the computer system, cooperative operation is exhibited on the computer system, and operation effects similar to those of the network interconnection apparatus of the first aspect can be obtained.

According to the present invention, it is possible to provide a network interconnection apparatus, a network interconnection method, a name resolution apparatus and a computer program, all enabling the suitable start process of the LAN terminals on a home private network with respect to start requests to the LAN terminals from an external network such as the Internet.

The network interconnection apparatus according to the present invention can be packaged as a home gateway apparatus including a broadband router function. For example, it becomes possible to turn the power source on state of a LAN terminal such as a home server at home from the outside the home via the Internet.

By the installation of a Web server function into such a home gateway apparatus, a remote user who performs an access from the outside a home can execute a start instruction of a home apparatus via the Internet by means of a Web browser normally installed in a personal computer or the like.

While a general Web server holds a fixed IP address, it is supposed that an IP address assigned by an ISP is dynamically changed in such a home gateway apparatus. Accordingly, a name resolution server equipped with a name resolution function of the home gateway apparatus, which registers the IP address assigned dynamically to the home gateway apparatus into a domain name service (DNS) server, is located on the Internet, and thereby it becomes possible to access the home gateway apparatus only by means of a domain name.

The Web server on the home gateway apparatus can limit accesses from the outside by an authentication function in order that only the certain users who have been allowed to connect can perform the start instructions of the LAN terminals at home. That is, when a remote user connects with a home gateway apparatus, the user is requested to enter user ID and a password, and an authentication process is executed.

A user previously registers LAN terminals which the user wishes to start by external accesses on a home LAN. Then, when start requests to the LAN terminals are performed from the outside, LAN apparatuses registered in advance are displayed as a list, and consequently the remote user can start desired equipment by simple operations of performing clicks on the Web browser among the displayed equipment. The home gateway apparatus sends start instruction packets to the corresponding equipment on the home LAN in response to such start requests.

There is the case where the protocols of the external network and the internal network are different from each other. In such a case, the home gateway apparatus performs a protocol conversion process for assimilating the protocol discrepancy. Moreover, the start instruction packet to the equipment on the home LAN may be issued by means of the magic packet technique.

Moreover, the Web server of the home gateway apparatus provides the function of confirming whether the equipment have started or not after the sending of the start instruction packets to the remote user. For example, the Web server sends an inquiry packet to the corresponding equipment in response to pressing of an update button on the Web browser screen. At this time, Web server confirms that the equipment has started when an answer packet is returned from the equipment, and displays, for example, "power ON" on the common gateway interface (CGI) of the Web. Moreover, when no response packets are returned, the Web server determines that the equipment has not started, and displays "power OFF" on the CGI of the Web.

It is necessary that the LAN terminals to be wished to be remotely started at home are previously registered in the home gateway apparatus. For simplifying the registration operation, the information of the computer names and the MAC addresses of the LAN terminals connected on the home LAN is collected and held as a database on the setting screen of the home gateway apparatus. The MAC addresses of the LAN terminals can be obtained by, for example, a DHCP process. When user registers them, because the computer names and the MAC addresses are displayed in a pull-down menu on the setting screen of the home gateway apparatus, the user can simply perform the registration operation by selecting in the menu the LAN terminal which the user wish to start.

The further objects, features and advantages of the present invention will be apparent from more detailed description based on the embodiments of the present invention, which will be described later, and the attached drawings.

BRIEF DESCRIPTION OF THE DRAWINGS

FIG. 12 is a view showing a configuration example of a management setting screen of the home gateway apparatus.

DESCRIPTION OF THE EMBODIMENT(S)

In the following, the attached drawings will be referred to while the embodiments of the present invention are described in detail.

A. System Configuration

Figure 1:
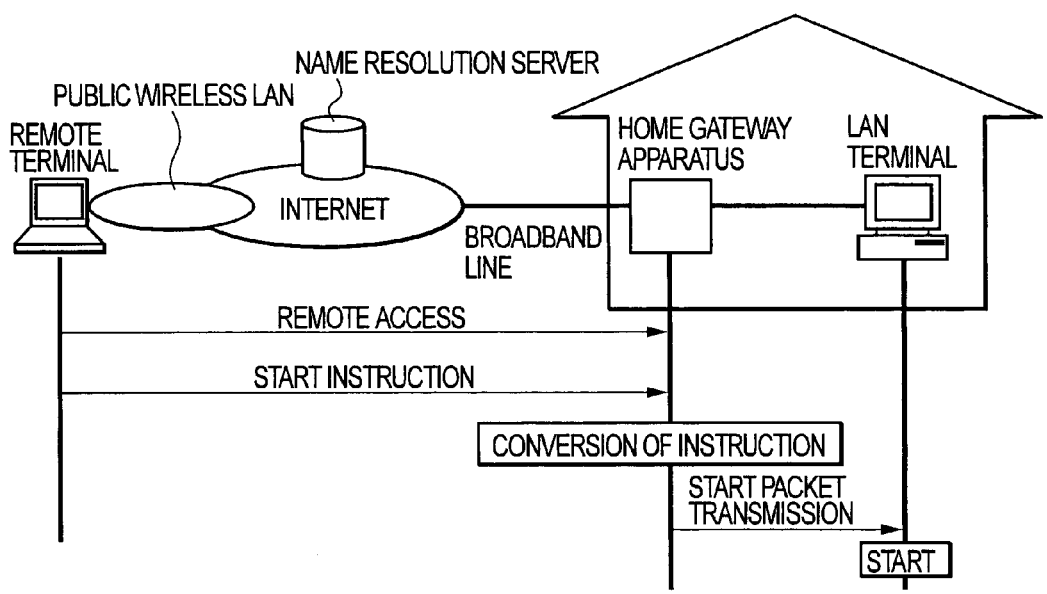
FIG. 1 is a view schematically showing a configuration of a communication system according to an embodiment of the present invention.

FIG. 1 schematically shows the configuration of a communication system of an embodiment according to the present invention. The communication system can suitably perform a start process in response to a start request to a LAN terminal on a home private network from a wide area network (WAN) such as the Internet.

As shown in the drawing, the Internet and the home LAN are interconnected with each other via a home gateway apparatus as an implemented form of a network interconnection apparatus according to the present invention. The home gateway apparatus is connected to the Internet via, for example, a broadband line such as ADSL or FTTH.

On the home LAN, a personal computer at the home, a home server storing contents downloaded via the Internet (or moved from a record medium) such as a moving image and music, and private contents including a photograph, a video and others, and LAN terminals in the other forms are connected. Incidentally, for avoiding the complexity of the drawing, only one LAN terminal is drawn.

The Internet has grown to a huge network as a result of the repetitions of interconnections of servers located on each universities, research institutes and the like in an autonomous manner and literally becomes the network of networks. The Internet includes the public switched telephone networks of respective carriers, public wireless LAN's and the like. On the Internet, various host apparatus such as information provision servers (not shown) for providing various information contents and name problem resolution servers (which will be described later) for resolving name problems at the time of network accesses are connected.

In the present embodiment, by the installation of the Web server function into the home gateway apparatus, a remote user accessing from the outside a home can executes a start instruction to home equipment via the Internet by means of a Web browser, which is normally installed in a personal computer or the like.

For example, a user (a remote user) who operates a remote terminal at a place where the user has gone remotely access the home gateway apparatus located in his or her own house via the public wireless LAN and the Internet.

At this time, in the home gateway apparatus, it is supposed that an IP address assigned by the ISP is dynamically changed. Accordingly, a name resolution server equipped with a name resolution function of the home gateway apparatus, which registers the IP address assigned dynamically to the home gateway apparatus into the DNS server, is located on the Internet, and thereby it becomes possible to access the home gateway apparatus only by means of a domain name.

The home gateway apparatus performs a predetermined authentication process (which will be described later) for confirming the authenticity of the remote user. The remote terminal which has succeeded in the authentication procedure can perform a start request of a home LAN terminal.

However, the user is required to register LAN terminals which the user wishes to start by external accesses on a home LAN previously. The details of a previous registration procedure will be described later.

The home gateway apparatus receives such start requests by proxy, and sends start instruction packets to the corresponding equipment on the home LAN. Although, there is the case where the protocols of the external network such as the Internet and the home LAN are different from each other, the home gateway apparatus performs a protocol conversion process for assimilating the discrepancies between the protocols. Moreover, on the home LAN, the start instruction packets to the corresponding equipment may be issued by means of the magic packet technique.

Moreover, the home gateway apparatus has a start state confirmation function for confirming the start state of each terminal on the home LAN. For example, aping program in which an IP packet is issued to the LAN terminals by means of an ICMP to confirm an answer can be used for the confirmation of the start states on the internal network.

Moreover, the home gateway apparatus provides to the remote user a start state presentation function of each terminal on the home LAN, a start execution instruction function to each terminal, and a start confirmation function to each terminal. In the present embodiment, start state presenting means, start execution instruction means and start confirmation means are provided in an HTML format. Consequently, on the remote terminal side, only by installing a standard Web browser, the presentation of the start states of the LAN terminals, the instruction of the execution of the starts, and the confirmation of the starts can be preformed via a Web page.

The details of the start state presentation function, the start execution instruction function and the start confirmation function of the LAN terminals will be described later.

B. Configuration of Each Apparatus

Figure 2:
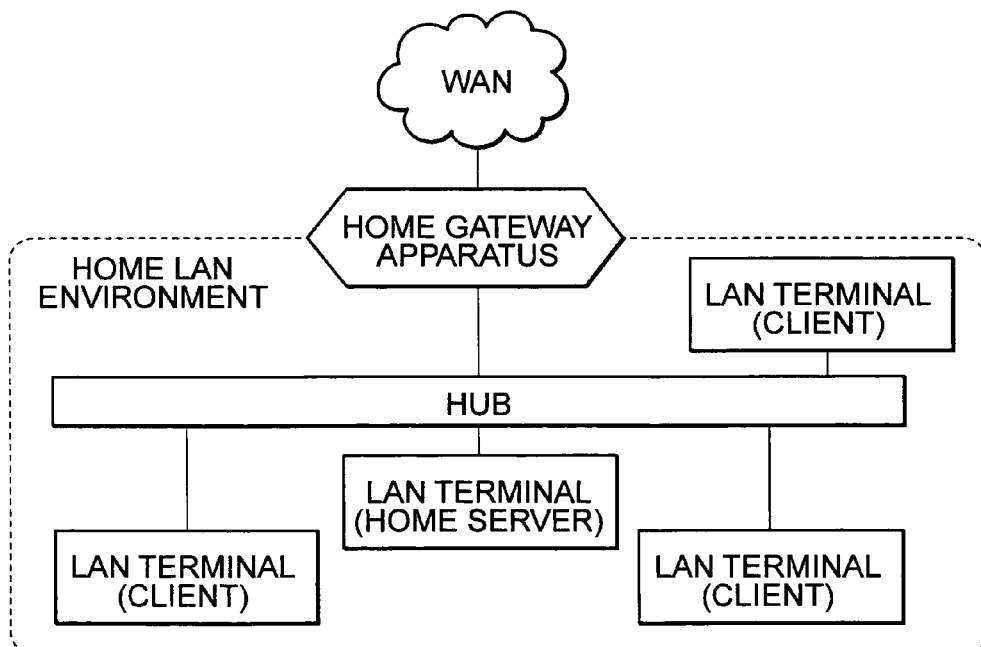
FIG. 2 is a view schematically showing a basic configuration of a home LAN.

FIG. 2 schematically shows a basic configuration of a home LAN. As shown in the same drawing, the home LAN constructed in a house is connected with an external network such as the Internet via a home gateway.

A plurality of home LAN terminals such as a home server and clients is located on the home LAN via, for example, a hub (a concentration device).

The home server obtains and stores contents from a content server (not shown) on the external network via the home gateway apparatus, and distributes the contents within the home. The home server can obtain contents through means other than the network such as a package medium and the reception of broadcasts. Moreover, the home server can accumulate private contents such as photographs and videos. In the drawing, although only one home server is drawn, a plurality of home servers may be constituted by every kind of contents.

The contents accumulated in the home server are commonly owned by a user group such as a home user who has a predetermined content using right and authentification. Each client terminal on the home LAN requests and obtains desired contents from the home server for a use.

Moreover, any user having the predetermined content using right or the authentification can access home LAN terminals such as a home server via the home gateway apparatus after a predetermined authentication procedure, even if the user is in a remote environment such as from a remote terminal on the Internet.

Figure 3:
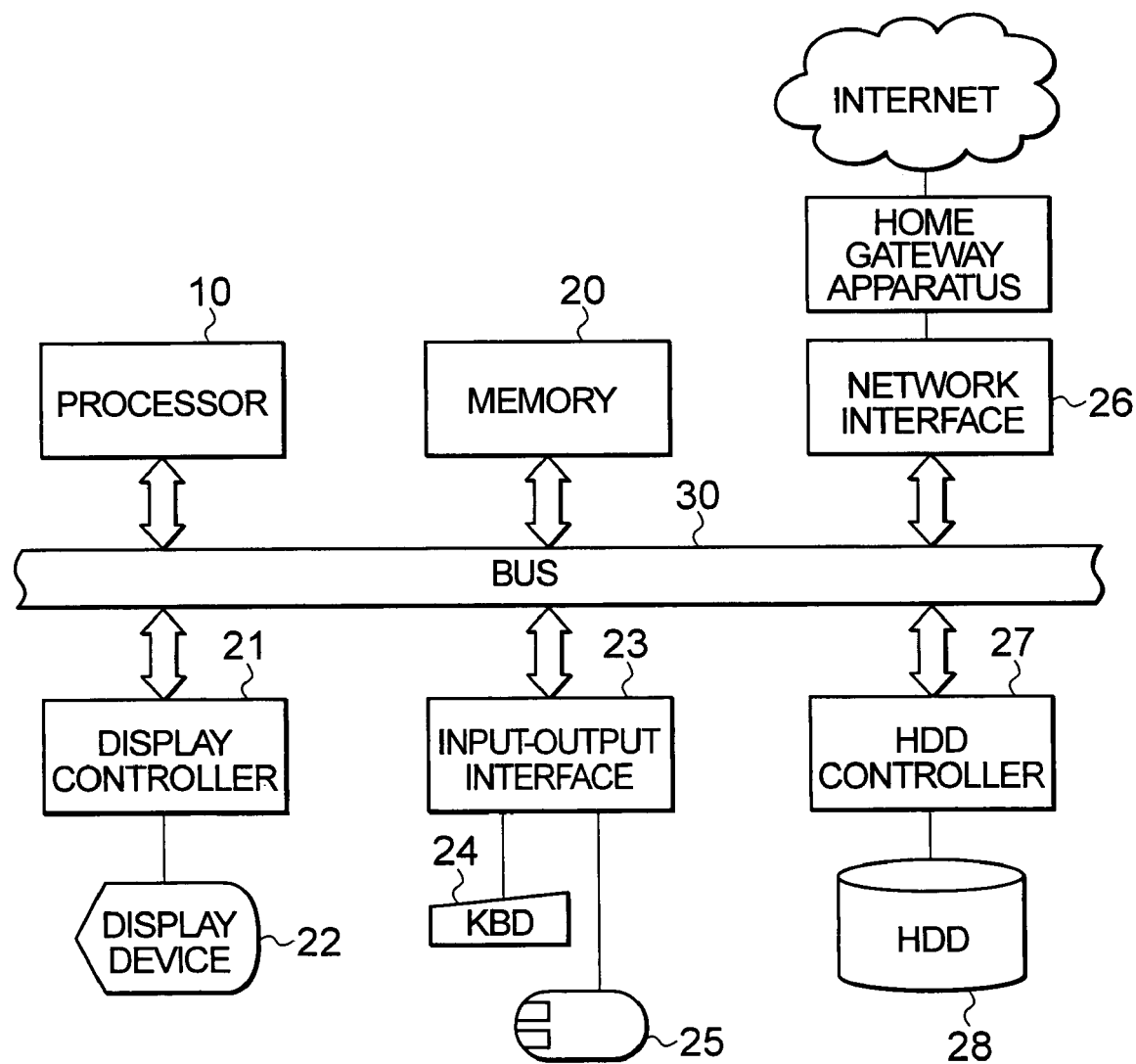
FIG. 3 is a view schematically showing a hardware configuration of an information processing apparatus operating as a host apparatus of home LAN terminals such as home servers and clients.

FIG. 3 schematically shows a hardware configuration of an information processing apparatus operating as a host apparatus of home LAN terminals such as a home server and clients.

The apparatus is configured to include a processor 10 as a main component. The processor 10 executes various kinds of processes on the basis of programs stored in a memory 20 under an execution environment provided by an operating system (OS). Moreover, the processor 10 controls various kinds of peripheral equipment connected through a bus 30. The peripheral equipment connected to the bus 30 is as follows.

The memory 20 is composed of, for example, a semiconductor memory such as a dynamic RAM (DRAM). The memory 20 is used to load program codes to be executed by the processor 10, or to store working data of an execution program temporarily.

A display controller 21 creates a display image in conformity with a rendering command sent from the processor 10 to transmit the display image to a display device 22. The display device 22 connected to the display controller outputs to display an image on a screen in conformity with display image information sent from the display controller 21.

An input-output interface 23 is connected to a keyboard 24 and a mouse 25, and transfers input signals from the keyboard 24 and the mouse 25 to the processor 10 via the bus 30.

A network interface 26 is connected to a home network (hub), and further is connected to an external network such as the Internet via the home gateway apparatus to control data communication through the Internet. That is, the network interface 26 transfers data transmitted from the processor 10 to another apparatus on the Internet, and receives data transmitted through the Internet to transfers the data to the processor 10.

A hard disk drive (HDD) controller 27 is connected to a large capacity external storage device 28 such as a HDD, the HDD controller 27 controls the input and the output of data to and from a connected HDD 28. The HDD 28 stores program of the operating system (OS), application programs and driver programs, all being to be executed by the processor.

When the host apparatus is the home server, a server application for executing, for example, the authentication process of each client on the network, or the provision of contents is installed on the HDD 28. Moreover, the contents to be provided to another home LAN terminal or another remote terminal are accumulated on the HDD 28.

Moreover, when the host apparatus is a client, a client application for executing the use of contents such as the reproduction of the contents provided from the server, or the Web browser is installed.

Such a kind of host apparatus can be built by the use of a general computer system such as a personal computer. Incidentally, for constituting the host apparatus, many circuit components are needed in addition to those shown in FIG. 3, but the circuit components are well known to those skilled in the art, and the circuit components do not configure the subject matter of the present invention. Accordingly, the circuit components are omitted in the present specification. Moreover, for avoiding the complexity of the drawing, it is to be noted that only a part of the connections among each hardware block is shown.

Figure 4:
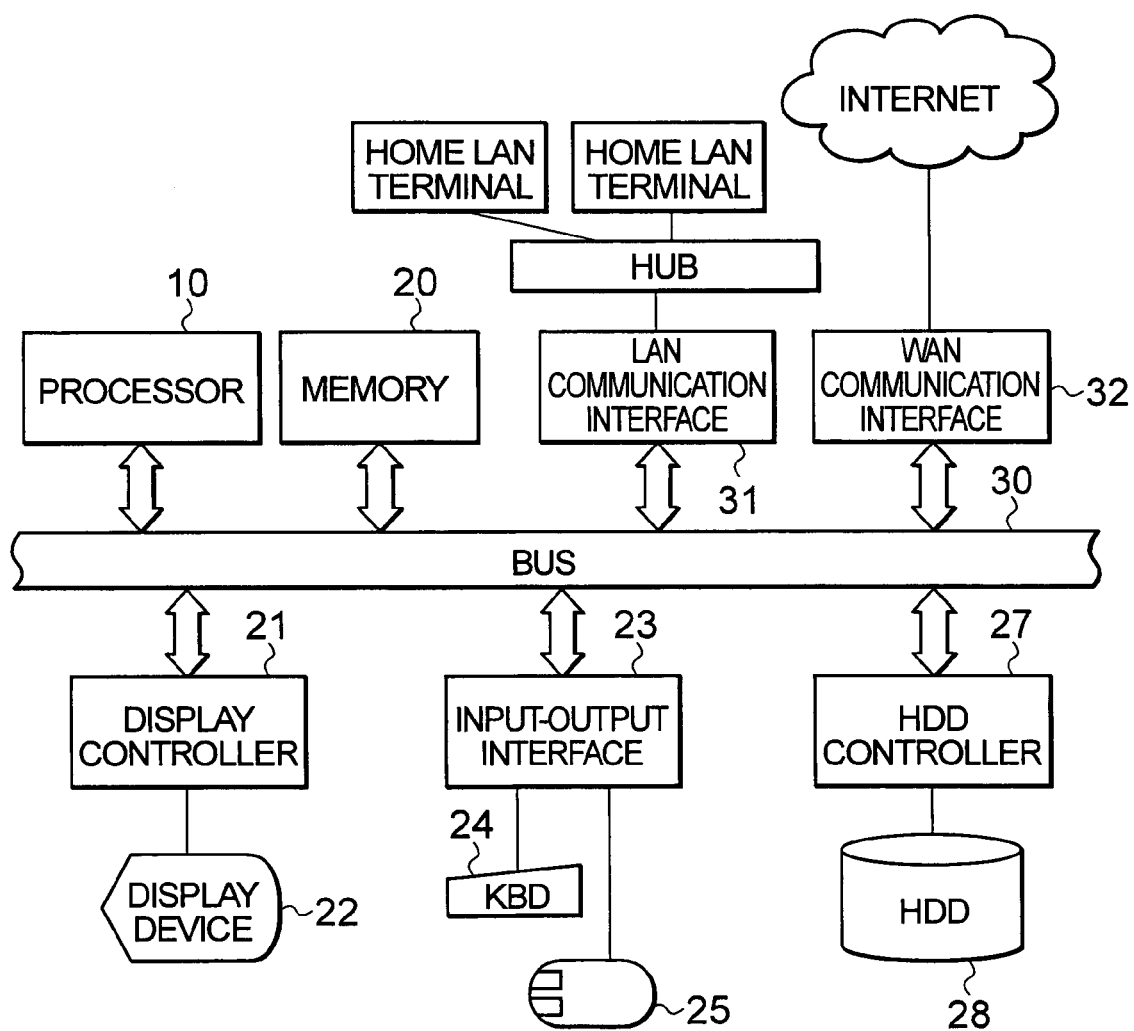
FIG. 4 is a view schematically showing a hardware configuration of an information processing apparatus operating as a home gateway apparatus.

FIG. 4 schematically shows a hardware configuration of an information processing apparatus operating as the home gateway apparatus. The home gateway apparatus can also be built by means of a general computer system. In the following, different points from the configuration of FIG. 3 will be chiefly described. The home gateway apparatus has a basic function of the connection among networks, and does not perform the interactive inputs of a user. Consequently, user interfaces such as a display, a keyboard and a mouse are not mandatory.

A LAN communication interface 31 is connected to the home LAN (hub). Moreover, a WAN communication interface 32 is connected to the external network such as the Internet. The home gateway apparatus controls the data communication between the home LAN and the external network, and provides a relaying function among the home LAN terminals and a remote terminal. Moreover, when communication protocols are different between networks, the home gateway apparatus performs a protocol conversion.

The home gateway apparatus includes a unique domain name. However, while the host apparatus such as the Web server has a fixed IP address, the home gateway apparatus does not have any fixed IP addresses, and the IP address is dynamically assigned at every start.

On the HDD 28 (or on a nonvolatile storage device having another form), an application for implementing a gateway function between the home LAN and a WAN, a start instruction processing application for performing the start state presentation, the start execution instruction and the start confirmation of the home LAN terminals, a Web server application for providing those start instruction processing procedures to the remote terminal in Web base, a start LAN terminal registration application for registering LAN terminals to be started by remote accesses, and the like are installed. Moreover, a correspondence table between the MAC address information of each home LAN to be obtained at the DHCP process and a computer name, authentication information such as a user name and a password, both necessary for the authentication process to be executed at a remote access from a remote terminal, and the like are also stored in the HDD 28.

Figure 5:
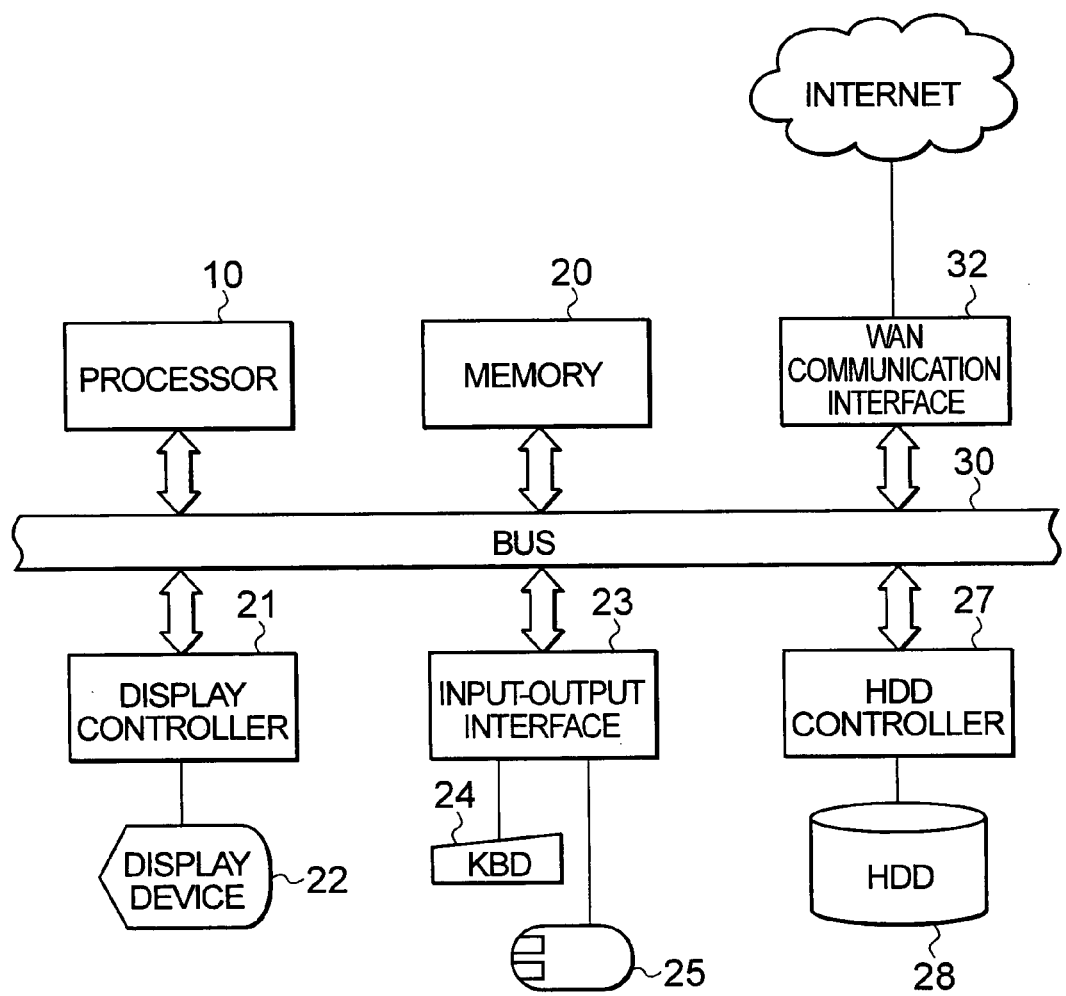
FIG. 5 is a view schematically showing a hardware configuration of an information processing apparatus operating as host apparatus on the Internet such as a remote terminal and a name resolution server.

FIG. 5 schematically shows a hardware configuration of an information processing apparatus operating as a host apparatus on the Internet such as a remote terminal and a name resolution server. These host apparatuses on the Internet can be also built by means of a general computer system. In the following, different points from those shown in FIGS. 3 and 4 will be chiefly described.

The WAN communication interface 32 is connected to an external network such as the Internet. When the host apparatus is a name resolution server or another server, the host apparatus is always connected to the Internet. The host apparatus such as a Web server owns a fixed IP address. On the other hand, in case of a remote terminal, the remote terminal is suitably connected to the Internet via, for example, an access point (AP) of a contracted provider, and IP addresses are dynamically assigned sequentially.

When the host apparatus is a name resolution server, in the HDD 28, a name resolution server application for registering IP addresses to be assigned to the home gateway apparatus dynamically into the DNS server is installed.

C. Functions of Home Gateway Apparatus

The home gateway apparatus of the present embodiment performs a start process on a home LAN in response to a start request from a remote terminal on a wide area network such as the Internet to a LAN terminal on the home private network. That is, the home gateway apparatus receives such a start request by proxy, and sends a start instruction packet to a corresponding equipment on the home LAN. There is the case where the protocols of the external network such as the Internet and the home LAN are different from each other, but the home gateway apparatus performs a protocol conversion process for assimilating the discrepancy of the protocols.

Figure 6:
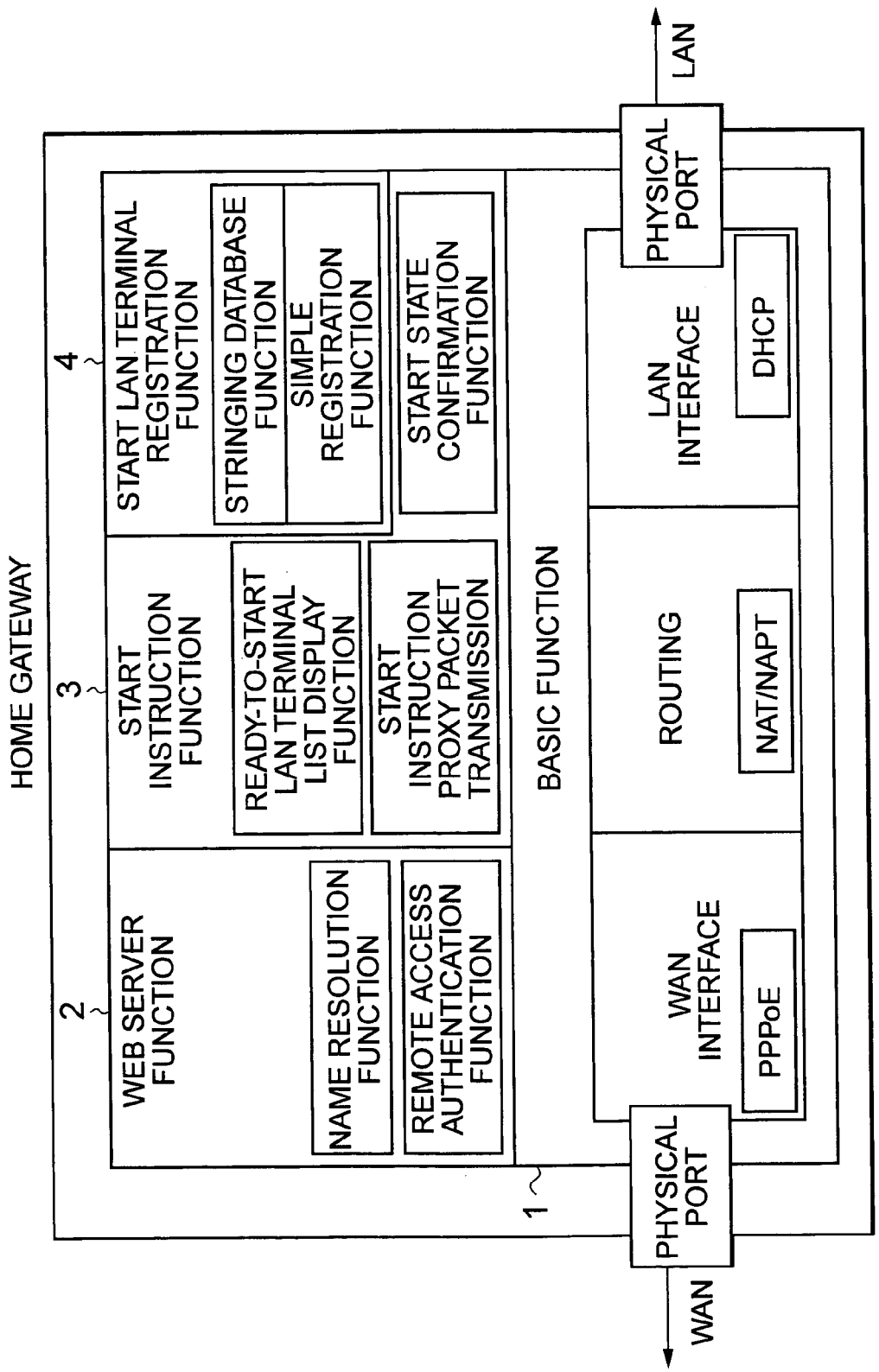
FIG. 6 is a view schematically showing a functional configuration of a home gateway apparatus.

The home gateway apparatus is composed of the following functional configuration (see FIG. 6).

(1) basic function (2) Web server function (3) start instruction function (4) starting LAN terminal registration function In the following, each function will be described.

C-1. Basic Function

The home gateway apparatus according to the present embodiment equipped with a broadband router function, which is used widely for broadband lines. Here, the broadband router function means to include both of a WAN interface and a LAN interface.

By means of the WAN interface, the connection to broadband lines such as ADSL and FTTH is performed. By means of a PPP over Ethernet (PPPoE) function for obtaining a user ID, password authentication, and a global IP address by an Internet service provider (ISP), the connection to the Internet is performed. The PPPoE is a standard for checking the username and the password of a user in such a case of a dial-up connection (PPP connection) on a network of Ethernet (registered trademark) or the like.

Moreover, the LAN interface includes a DHCP server function for distributing private IP addresses to the LAN terminals connected to the home LAN, and dynamically distributes the private IP addresses to the plurality of LAN terminals. Hereupon, the dynamic host configuration protocol (DHCP) is one of the protocol groups of TCP/IP. The DHCP is a protocol for assigning an IP address dynamically to each client at the time of a start and for withdrawing the IP address at the time of an end. In the DHCP process, the information of the address of a default gateway, a domain name, a subnet mask and the like can be also informed to a client. In the present embodiment, the home gateway apparatus holds mapping information of the MAC addresses of the LAN terminals, the distributed IP addresses and the computer name as a correspondence table.

A physical interface is conformed with IEEE 802.3 Ethernet, and equipped with a plurality of connection ports in order to enable the connection of a plurality of LAN terminals.

Moreover, the home gateway apparatus includes a network address translator (NAT) function for converting a private IP address to a global IP address as a routing function between a LAN and a WAN, and a network address port translation (NAPT) function for enabling a plurality of terminals to be simultaneously connected to the Internet. According to the latter function, it becomes possible to commonly own a global IP address as one of network address transformations (NAT's) with a plurality of host apparatuses in a system by changing port numbers in addition to the IP addresses.

Incidentally, it is supposed that the power source of the home gateway apparatus according to the present embodiment is required always in the on state at a home similar to many broadband routers.

C-2. Web Server Function

The Web server function is one of the important functions for implementing the present invention in a more suitable form, and is an application to be necessary for a remote terminal to access the home gateway apparatus from the outside the house via the Internet. That is, the home gateway apparatus provides start services (which will be described later) of home LAN terminals as a Web server, the remote terminal is not required to be equipped with specific software and hardware. If the remote terminal is only equipped with a generic Web browser to be used for Web surfing of the Internet ordinarily, it becomes possible to perform the connection to the home gateway apparatus.

In the present embodiment, the home gateway apparatus includes the following functions as a Web server.

C-2-1. Name Resolution Function

While an ordinal Web server holds a fixed IP address, such a home gateway apparatus would be supposed to be under dynamic changes of the IP address assigned by an ISP. In the present embodiment, a resolution function of a name problem is made to be available on the Internet. As a result, a remote terminal can access the home gateway apparatus by using only a domain name.

As the name resolution, for example, the following two patterns are possible.

(1) Using a Dynamic DNS Service Provided by the ISP

In this case, the home gateway apparatus is not required to be equipped with a specific function. Accordingly, the description about this case is omitted in the present specification.

(2) Resolving Name Using a Name Resolution Server

The name resolution method is realized by locating a server for the name resolution on the Internet, and by registering an IP address into the name resolution server at every obtaining of the IP address by the home gateway apparatus.

Figure 7:
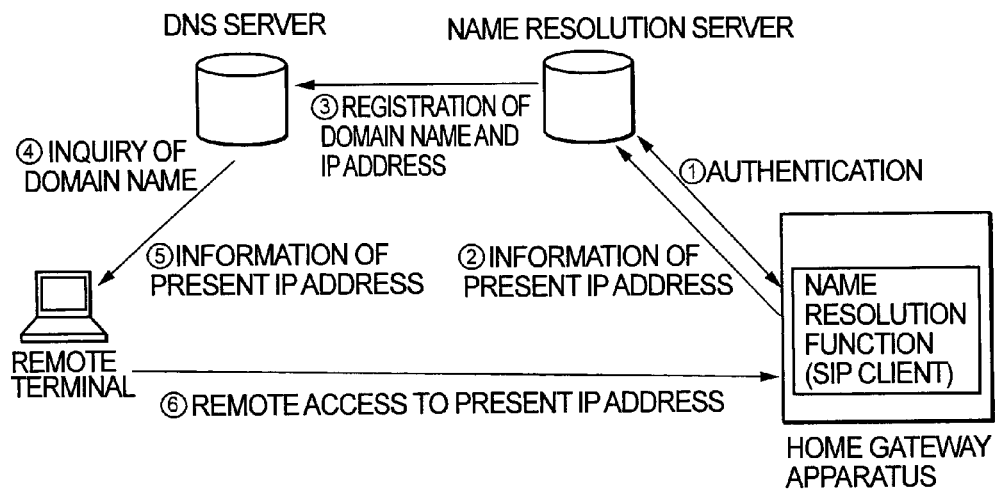
FIG. 7 is a view for illustrating a resolving processing procedure of a name problem using a name resolution server.

FIG. 7 is referred to while a name problem resolving processing procedure using the name resolution server is described.

Step 1)

The home gateway apparatus performs authentication with the name resolution server. The name resolution server determines the home gateway apparatus is connected or not according to the result of the authentication process. A user ID and a password of the home gateway apparatus for the authentication are held in the name resolution server as a database in advance, and the home gateway apparatus executes an authentication request using the user ID and the password to the name resolution server.

Step 2)

After the success of the authentication, the home gateway apparatus informs the name resolution server of a global IP address dynamically given to the WAN interface connected to the broadband line. The timing of the information of the IP address is instant execution at the time of the addition of a new IP address.

Step 3)

When the name resolution server receives the information of the IP address from the home gateway apparatus, the name resolution server refers to an inside database to extract a domain name given in advance to the home gateway apparatus. Next, the name resolution server registers the domain name and the informed IP address in a DNS server managing a corresponding network space. The DNS server registers the information related to the informed domain name and the global IP address into the own database.

By the registration of the global IP address dynamically allocated to the home gateway apparatus together with the domain name into the DNS server, the access to the home gateway apparatus using a normal domain name service is possible on the Internet.

Step 4)

The remote terminal inquires the domain name of the home gateway apparatus from the DNS server.

Step 5)

The DNS server refers to the latest database, and answers the remote terminal the IP address of the home gateway apparatus.

Step 6)

The remote terminal executes a remote access to the obtained IP address.

When the name resolution server is used, the protocol between the name resolution server and the home gateway apparatus is supposed to be SIP (IETF RFC3261). In this case, the home gateway apparatus is equipped with an SIP client function, and the name resolution server is equipped with an SIP server function. There is a trust relation between the home gateway apparatus and the name resolution server, and user authentication is performed. Moreover, the transmission and the reception of registration information is encoded to secure security.

Incidentally, the session initiation protocol (SIP) is a signaling protocol at an application layer, and regulates a transmission method and a transmission procedure between two or more nodes to set a session. The SIP has a high affinity with other protocols to be used for the DNS, a simplified directory access protocol (LDAP) and the like, all being used in the Internet.

C-2-2. Remote Access Authentication Function

The Web server on the home gateway apparatus can limit external accesses by the authentication function in order that only certain users allowed to connect can perform a start instruction of a LAN terminal in a home. That is, when a remote user connects to the home gateway apparatus, a user ID and a password are required to enter, and an authentication process is executed.

Figure 8:
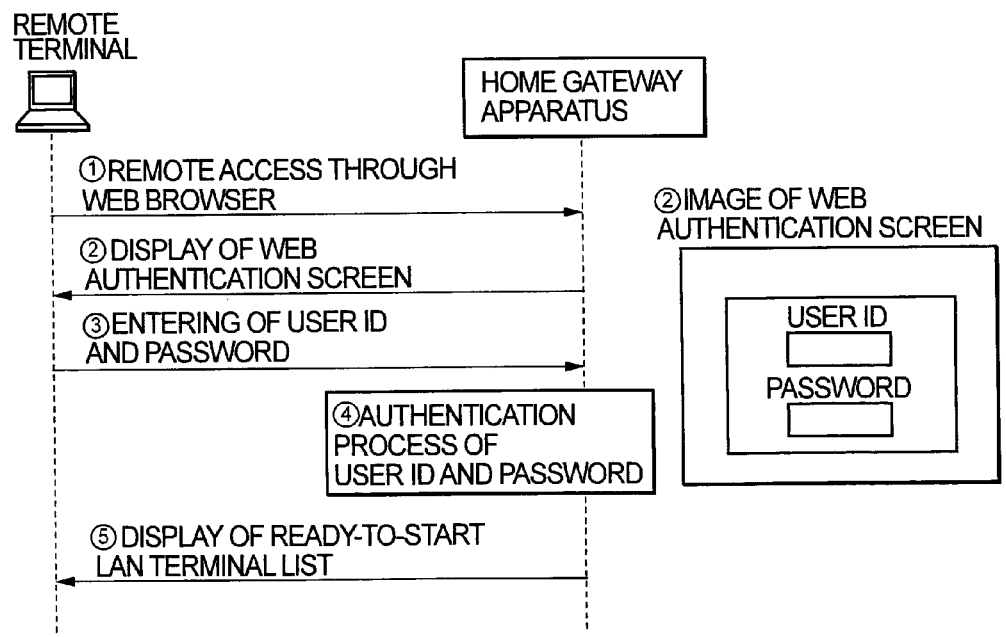
FIG. 8 is an operation sequence diagram showing an authentication processing procedure which a home gateway apparatus executes for a remote access.

FIG. 8 is referred to while an authentication processing procedure which the home gateway apparatus executes to a remote access is described.

Step 11)

The home gateway apparatus is remotely accessed from a remote terminal through a Web browser.

Step 12)

The home gateway apparatus displays an authentication screen for authenticating by using a user ID and a password. The user ID and the password are previously set in the home gateway apparatus on the home LAN by the user.

Step 13)

A user ID and a password are entered on a Web browser screen from the remote terminal.

Step 14)

The home gateway apparatus executes the authentication of the user ID and the password.

Step 15)

When the authentication by the home gateway apparatus is OK, a ready-to-start LAN terminal list is displayed.

C-3. Start Instruction Function

The home gateway apparatus receives a start request by proxy from the remote user who succeeded the authentication, and sends a start instruction packet to the corresponding equipment on the home LAN. Moreover, the home gateway apparatus provides to the remote user the start state presentation function of each terminal on the home LAN, the start execution instruction function to each terminal, and the start confirmation function to each terminal. These functions are provided to the remote terminal by the Web server function in the HTML format. The remote terminal which has succeeded in the authentication can use the functions if only equipped with a standard Web browser.

C-3-1. Ready-to-start LAN Terminal List Display Function

When the user ID and the password are determined as acceptable by the remote access authentication function, a list of LAN terminals which are ready to start is displayed as a Web screen.

Figure 9:
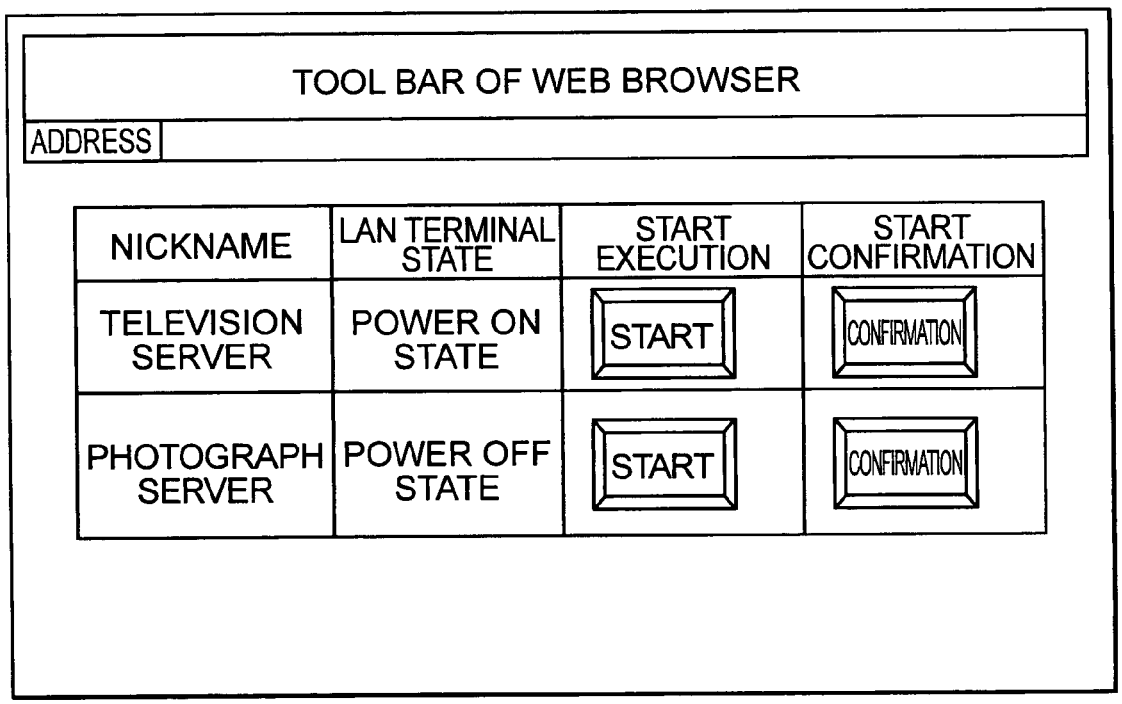
FIG. 9 is a view showing an example of a screen configuration of a list of a LAN terminal.

FIG. 9 shows a configuration example of the screen of the ready-to-start LAN terminal list. As shown in the same drawing, the following information is displayed to each LAN terminal.

(1) Nickname

The names of the LAN terminals of which the power source can be started from the outside among the LAN terminals connected within the home are displayed by nicknames such as computer names.

(2) States of LAN Terminals (Power on State, Power Off State)

Whether the states of the corresponding LAN terminals are power on or power off is displayed.

(3) Start Execution/Start Button

When this button is clicked from the Web browser of the remote terminal, a LAN terminal which the user wishes to start starts.

(4) State Confirmation/Confirmation Button

It is a button for dynamically confirming which the power source of the LAN terminal is currently on or off.

C-3-2. Start Instruction Proxy Packet Transmission Function

The home gateway apparatus according to the present embodiment includes a function of receiving a start instruction, which is normally instructs to a LAN terminal in a home, by proxy from a remote terminal to execute the instruction, i.e. start instruction proxy packet transmission function.

Figure 10:
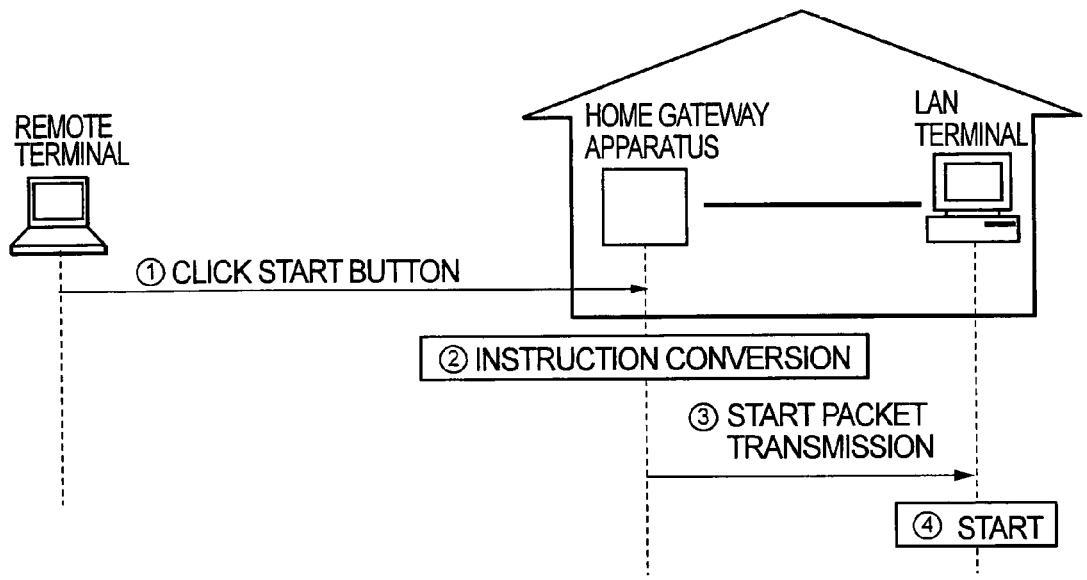
FIG. 10 is a view for illustrating an operation of a start instruction proxy packet transmission function.

FIG. 10 illustrates an operation of the start instruction proxy packet transmission function. In case of via the Internet, the remote terminal cannot directly transmit any start packets to the LAN terminals in the house. Accordingly, the remote terminal executes the command to the home gateway apparatus, and the home gateway apparatus transmits the start packets as a proxy. The operation procedure of the start instruction proxy packet transmission function is as follows.

Step 21)

The start button of a desired LAN terminal in the ready-to-start LAN terminal list shown in FIG. 9 is clicked from the remote terminal.

Step 22)

After the above action, the home gateway apparatus transmits a start packet magic packet from the LAN interface to the desired LAN terminal.

Step 23)

The LAN terminal which has received the start packet starts. The result is reflected on a terminal state display screen (see FIG. 9).

C-3-3. State Confirmation Function

Figure 11:
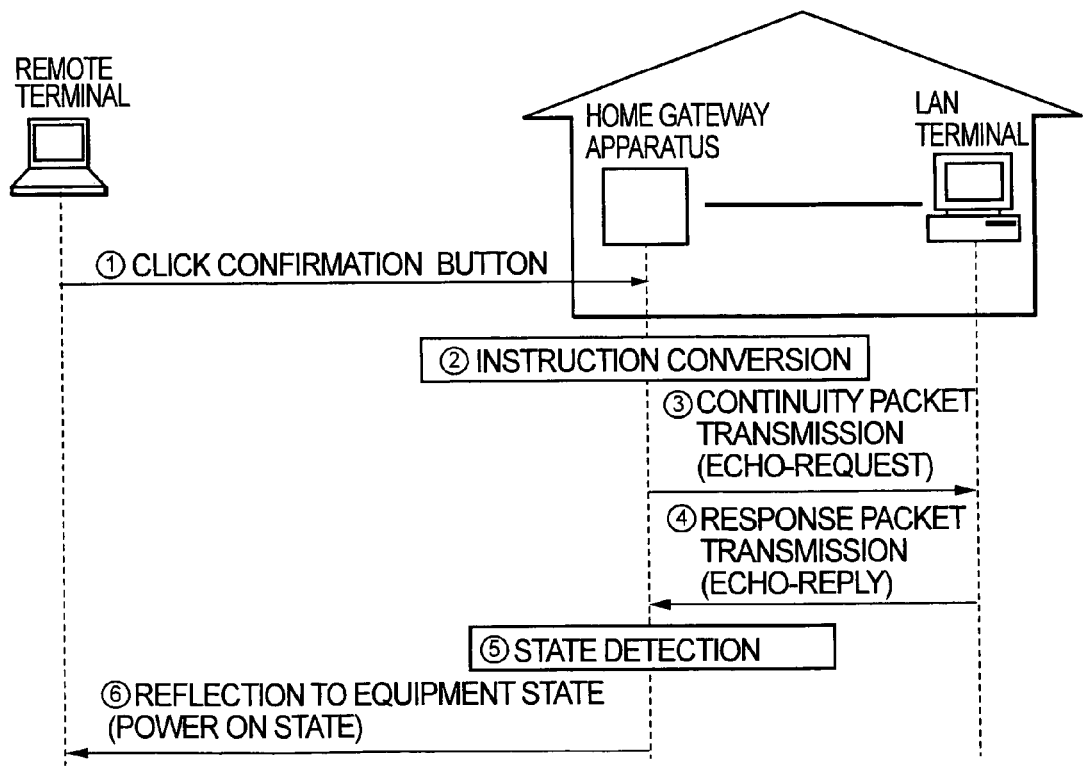
FIG. 11 is a view for illustrating an operation procedure of a home gateway apparatus performing LAN terminal state confirmation.

This function is for confirming whether the desired LAN terminal is in a power on state or in a power off state now. The operation procedure of the LAN terminal state confirmation by the home gateway apparatus is as follows (see FIG. 11).

Step 31)

The confirmation button of a desired LAN terminal in the ready-to-start LAN terminal list shown in FIG. 9 is clicked thorough the remote terminal.

Step 32)

The home gateway apparatus converts its command, and transmits a continuity confirmation packet from the LAN interface of the home gateway apparatus to the desired LAN terminal. The continuity confirmation packet in conformity with the ICMP (RFC 792/RFC 1812) protocol, which is widely used in a TCP/IP network, transmits an Echo-Request packet to the LAN terminal. The Internet control message protocol (ICMP) is a protocol for informing a sender of the occurrence of an irregular state in a network and a resulted error. As applications using ICMP, ping and trace rout can be cited.

Step 33)

When the power source of a LAN terminal is on state, a response packet (Echo-Reply) is transmitted to the home gateway apparatus. When LAN terminals is off state started, no replies are returned.

Step 34)

When the packets of the LAN interface and the Echo-Reply are received, the home gateway apparatus determines that the power source of the desired LAN terminal is on state, and displays "POWER ON STATE" in the state column of the LAN terminal. On the contrary, when no Echo-Reply packets are returned from the LAN terminal after the transmission of the Echo-Request packet, the home gateway apparatus displays "POWER OFF STATE".

C-4. Starting LAN Terminal Registration Function

It is necessary for a user to register in advance the LAN terminals which the user wishes to start in a home. The home gateway apparatus according to the present embodiment includes a function of performing the previous registration procedure of the terminals which start in response to start requests from a remote terminal among the home LAN terminals. The home gateway apparatus receives by proxy only the start requests to the previously registered home LAN terminals, and transfers the start requests to the requested destination terminals.

At the time of the registration, the home gateway apparatus includes the Web server function which is connectable only from the LAN interface, and the registration process can be performed on a Web browser.

The information necessary for the starts of the LAN terminals is possibly only the MAC addresses of the LAN terminals to be wished to start. For example, in case of using commercially available software, which transmits a magic packet, the MAC addresses of the LAN terminals to be wished to start is normally registered by manual.

However, in case of the manual registration of the MAC addresses, the MAC addresses, each having 12 digits, of the LAN terminals to be wished to start should be referred to, and then the MAC addresses should be registered on the home gateway apparatus. Such operations are troublesome. Therefore, the present embodiment is implemented by the following method for simplifying the registration operations.

C-4-1. Stringing Database Function

When the home gateway apparatus adds private IP addresses to LAN terminals by means of the DHCP function, the MAC addresses and the terminal names of the LAN terminals can be obtained. For example, when the operating system "Windows" of Microsoft Corporation in US is used, the computer names provided by Windows can be obtained at the time of the DHCP process. The home gateway apparatus collects the information of the collected computer names and the MAC addresses to perform the stringing of the information, and holds the information as database information.

C-4-2. Simple Registration Function

FIG. 12 shows a configuration example of a management setting screen of the home gateway apparatus. On the screen, the following setting operations can be performed.

(1) Nickname Setting

It is possible to set preferable names to the LAN terminals to be wished to start arbitrarily.

(2) Registration

Here, the LAN terminals to be wished to start are registered. In case of the selection in a list, computer names can be selected in a pull-down menu to be registered in place of using MAC addresses. Thereby, the registration can be simply performed. However, if the MAC addresses are wished to be manually registered, it is possible to set them by manual registration.

(3) User ID/Password

A user ID and a password at the time of accessing remotely is set here. Incidentally, it maybe set to prohibit the remote access when no user ID and no password are set.

(4) Start Test

It is a function of starting desired LAN terminals in the home LAN in place of remote starting. Before the execution from a remote place, the operation can be confirmed at a home.

In the above, specific embodiments have been referred to while the present invention have been described in detail. However, it is apparent that the skilled in the art can modify or substitute the embodiments without departing from the spirit and the scope of the present invention. That is, the form of exemplification has been disclosed with regard to the present invention, the restrictive interpretation of the contents of the present specification should not be made. Claims should be referred to for the judgment of the scope of the present invention.

What is claimed is:

1. A network interconnection apparatus for interconnecting an external network with an internal network, said network interconnection apparatus comprising:

first communication means for communicating on said external network; second communication means for communicating on said internal network;

internal network management means for obtaining a configuration in said internal network and managing correspondence relations among a unique address of each terminal on said internal network, a terminal name easily identifiable by a user, and a private network address assigned in said internal network;

start request reception means for receiving by proxy a start request to a terminal on said internal network via said external network; and start request transfer means for identifying said terminal of requested destination of said start request received by said start request reception means based on said correspondence relations and transferring said start request to said terminal of said requested destination via said internal network.

2. The network interconnection apparatus according to claim 1, wherein said start request to said terminal on said internal network via said external network is transmitted by identifying a domain name of said network interconnection apparatus and a terminal name of said start request destination terminal.

3. The network interconnection apparatus according to claim 1, wherein a global network address on said external network is dynamically assigned to said network interconnection apparatus, a start request is transmitted to said network interconnection apparatus by using name resolution means disposed on said external network for managing a correspondence relation between said domain name and said global network address of said network interconnection apparatus.

4. The network interconnection apparatus according to claim 1, wherein said start request transfer means comprises conversion means in order for assimilating discrepancy of protocols between said external network and said internal network.

5. The network interconnection apparatus according to claim 1, wherein said start request transfer means transfers a start request to said requested destination terminal via said internal network using a magic packet.

6. The network interconnection apparatus according to claim 1, further comprising:

authentication processing means for performing a predetermined authentication procedure to an access requesting source via said external network;

wherein, in response to a success of said authentication procedure, said start request reception means receives said start request by proxy and/or said start request transfer means transfers said start request to said requested destination terminal.

7. The network interconnection apparatus according to claim 1, further comprising: start state confirmation means for confirming a start state of each terminal on said internal network.

8. The network interconnection apparatus according to claim 1, further comprising:

pre-processing means for performing a previous registration procedure on said internal network with respect to a terminal to be started in response to said start request from said external network among said terminal managed by said internal network management means;

wherein, only a case where said start request destination terminal is previously registered, said start request reception means receives said start request by proxy and/or said start request transfer means transfers said start requests to said requested destination terminal.

9. The network interconnection apparatus according to claim 1, further comprising:

internal network information providing means for providing to a start requesting source via said external network, including;

start state presenting means of each terminal on said internal network;

start execution instruction means to said each terminal; and start confirmation means to each terminal.

10. The network interconnection apparatus according to claim 9, wherein said internal network information providing means provides said start state presenting means, said start execution instruction means, and said start confirmation means in a format of Hyper Text Markup Language (HTML).

11. The network interconnection apparatus according to claim 9, wherein said internal network information providing means performs operations of start states presentation, start execution instruction, and start confirmation presentation, all utilizing terminal names which a user can easily identify.

12. A network interconnection method for interconnecting an external network with an internal network, said network interconnection method comprising the steps of:

An internal network management step of obtaining a configuration in said internal network and managing correspondence relations among a unique address of each terminal on said internal network, a terminal name easily identifiable by a user, and a private network address assigned in said internal network;

a start request reception step of receiving by proxy a start request to a terminal on said internal network via said external network; and a start request transfer step of identifying said terminal of requested destination of said start request received by said start request reception step based on said correspondence relations and transferring said start request to said terminal of said requested destination via said internal network.

13. The network interconnection method according to claim 12, wherein said start request to said terminal on said internal network via said external network is transmitted by identifying a domain name of said network interconnection apparatus and a terminal name of said start request destination terminal.

14. The network interconnection method according to claim 12, wherein a global network address on said external network is dynamically assigned to said network interconnection apparatus, a start request is transmitted to said network interconnection apparatus by using name resolution means disposed on said external network for managing a correspondence relation between said domain name and said global network address of said network interconnection apparatus.

15. The network interconnection method according to claim 12, wherein said start request transfer step comprises a conversion step in order for assimilating discrepancy of protocols between said external network and said internal network.

16. The network interconnection method according to claim 12, wherein said start request transfer step transfers a start request to said requested destination terminal via said internal network using a magic packet.

17. The network interconnection method according to claim 12, further comprising:

an authentication processing step of performing a predetermined authentication procedure to an access requesting source via said external network; wherein, in response to a success of said authentication procedure, said start request reception step receives said start request by proxy and/or said start request transfer step transfers said start request to said requested destination terminal.

18. The network interconnection method according to claim 12, further comprising: a start state confirmation step of confirming a start state of each terminal on said internal network.

19. The network interconnection method according to claim 12, further comprising:

a pre-processing step of performing a previous registration procedure on said internal network with respect to a terminal to be started in response to said start request from said external network among said terminal managed by said internal network management step;

wherein, only a case where said start request destination terminal is previously registered, said start request reception step receives said start request by proxy and/or said start request transfer step transfers said start requests to said requested destination terminal.

20. The network interconnection method according to claim 12, further comprising the steps of:

an internal network information providing step of providing to a start requesting source via said external network, including;

start state presenting means of each terminal on said internal network;

start execution instruction means to said each terminal; and start confirmation means to each terminal.

21. The network interconnection method according to claim 12, wherein said internal network information providing step provides said start state presenting means, said start execution instruction means, and said start confirmation means in a format of Hyper Text Markup Language (HTML).

22. The network interconnection method according to claim 12, wherein said internal network information providing step performs operations of start states presentation, start execution instruction, and start confirmation presentation, all utilizing terminal names which a user can easily identify.

23. A computer-readable medium storing a computer program to execute a process for interconnecting an external network and an internal network on a computer system, said computer program comprising:

an internal network management step of obtaining a configuration in the internal network to manage correspondence relations among a unique address of each terminal on the internal network, terminal names to be easily identified by a user, and private network addresses assigned in the network;

a start request reception step of receiving start requests to the terminals on the internal network via the external network by proxy; and a start request transfer step of identifying the terminals of requested destinations of the start requests received at the start request reception step on a basis of the correspondence relations to transfer the start requests to the terminals of the requested destinations via the internal network.

* * * * *